United States Patent [19]

Buckler

[11] 3,769,838

[45] Nov. 6, 1973

[54] WAVE MEASURING APPARATUS

[75] Inventor: Lawrence A. Buckler, Nova Scotia, Canada

[73] Assignee: Her Majesty the Queen in right of Canada, as represented by the Minister of National Defence

[22] Filed: Nov. 18, 1971

[21] Appl. No.: 199,951

[30] Foreign Application Priority Data

Jan. 29, 1971 Canada .............................. 104,004

[52] U.S. Cl. ............................ 73/170 A, 73/517 R
[51] Int. Cl. .............................................. G01p 5/00
[58] Field of Search ....................... 73/170 A, 517 R

[56] References Cited
UNITED STATES PATENTS 3,110,178 11/1963 Marks et al. ....................... 73/170 A
3,383,915 5/1968 Gilbert .............................. 73/170 A Primary Examiner—Richard C. Queisser
Assistant Examiner—Stephen A. Kreitman
Attorney—R. S. Sciascia et al.

[57] ABSTRACT

Wave measuring apparatus for determining the wave height on the surface of the sea, including a buoy having an antenna whereby when floating on the sea its motion causes electronic circuitry within it to transmit bursts of RF signals, the pulse repetition rate varying directly in proportion to the acceleration applied to the buoy as it moves up and down on the surface of the sea in which it is located. Ship-borne apparatus is provided to receive the signals transmitted by the wave buoy to analyze them and to provide an indication of the height of the waves of the sea in which the buoy is located.

10 Claims, 14 Drawing Figures

EQUIVALENT CIRCUIT AT FM TERMINALS

TRANSFER CHARACTERISTICS

INTEGRATOR FREQUENCY RESPONSE
AC INTEGRATOR SHOWING FREQUENCY RESPONSE

HIGH INFIDELITY AC INTEGRATOR

WIND WAVES AT SEA

| | | | | | | | | | | | | | | | | | | | | | | |
|---|---|---|---|---|---|---|---|---|---|---|---|---|---|---|---|---|---|---|---|---|---|---|
| 1 WIND VELOCITY KNOTS | 4 | 5 | 6 | 7 | 8 | 9 | 10 | | 20 | | 30 | | 40 | | 50 | 60 | 70 | | | | | |
| 2 BEAUFORT WIND AND DESCRIPTION | LIGHT AIR | LIGHT BREEZE | | GENTLE BREEZE | | | MODERATE BREEZE | | FRESH BREEZE | | STRONG BREEZE | | MOD GALE | FRESH GALE | STRONG GALE | WHOLE GALE | STORM | | | | | 11 |
| 3 REQUIRED FETCH IN MILES | FETCH IS THE NUMBER OF MILES A GIVEN WIND HAS BEEN BLOWING OVER OPEN WATER | | | | | | 50 | | 200 | | 300 | 400 | 500 | 600 | 700 | | | | | | | |
| 4 REQUIRED WIND DURATION IN HOURS | DURATION IS THE TIME A GIVEN WIND HAS BEEN BLOWING OVER OPEN WATER | | | | | | 5 | | 25 | | 30 | | | 35 | | | | | | | | |
| | IF THE FETCH AND DURATION ARE AS GREAT AS INDICATED ABOVE, THE FOLLOWING WAVE CONDITION WILL EXIST. WAVE HEIGHTS MAY BE UP TO 10% GREATER IF FETCH AND DURATION ARE GREATER | | | | | | | | | | | | | | | | | | | | | |
| 5 WAVE HEIGHT CREST TO TROUGH IN FEET (H) | | | | | 2 WHITE CAPS FORM | | | 4 | 6 | 8 | 10 | 15 | 20 25 30 | | 40 50 60 | | | | | | | |
| 6 SEA STATE AND DESCRIPTION | SMOOTH | | | | 2 SLIGHT | | 3 MODERATE | 4 ROUGH | 5 VERY ROUGH | | 6 HIGH | | 7 VERY HIGH | | 8 PRECIPITOUS | | | | | | | |
| 7 WAVE PERIOD SEC. (T) | 1 | | 2 | | | | 3 | 4 | 6 | | 8 | | 10 | | 12 | 14 | 16 | 18 20 | | | | |
| 8 WAVE LENGTH IN FEET (λ) | | | 20 | | | 40 60 | 80 100 | | 150 200 | | 300 400 500 600 | | | 800 1000 | | 1400 1800 | | | | | | |
| 9 WAVE VELOCITY KNOTS | | 5 | | | | 10 | | 15 | 20 | | 25 | 30 | | 35 40 | | 45 50 55 60 | | | | | | |
| 10 PARTICLE VELOCITY FEET/SEC. | 1 | | | 2 | | | 3 | 4 | 5 | | 6 | | 8 | 10 | 12 | 14 | | | | | | |
| 11 WIND VELOCITY KNOTS | 4 | 5 | 6 | 7 | 8 9 10 | | | | 20 | | 30 | | 40 | | 50 | 60 | 70 | | | | | |

THE TABLE APPLIES ONLY TO WAVES GENERATED BY THE LOCAL WIND AND DOES NOT APPLY TO SWELL ORIGINATING ELSEWHERE

WARNING: PRESENCE OF SWELL MAKES ACCURATE WAVE OBSERVATION DIFFICULT

NOTE:
(a) THE HEIGHT OF WAVES IS ARBITRARILY CHOSEN AS THE HEIGHT OF THE HIGHEST 1/3 OF THE WAVES. OCCASSIONAL WAVES CAUSED BY INTERFERENCE BETWEEN WAVES OR BETWEEN WAVES AND SWELL MAY BE CONSIDERABLE LARGER
(b) ONLY LINES 7,8 AND 9 ARE APPLICABLE TO SWELL AS WELL AS WAVES
(c) THE ABOVE VALUES ARE ONLY APPROXIMATE DUE BOTH TO LACK OF PRECISE DATA AND TO THE DIFFICULTY IN EXPRESSING IT IN A SINGLE EASY WAY
(d) BELOW THE SURFACE THE WAVE MOTION DECREASES BY 1/2 FOR EVERY 1/9 OF A WAVE LENGTH OF DEPTH INCREASE
(e) OBSERVATIONS AND COMMENTS LEADING TO INCREASED ACCURACY AND USEFULNESS ARE DESIRED

FIG. 9

PROFILE OF TROCHOIDAL WAVE

WAVE MEASURING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to wave measuring apparatus for determining information relating to waves on the surface of a liquid.

When ships go to sea during extensive sea trials, considerable data is collected which is used in laboratory analysis to determine exactly how the ship behaved during the trials. One of the parameters which must be taken into account is the condition of the sea in which the ship is located. The ship's performance is, of course, affected by the roughness of the sea and thus it is desirable to know the particular Sea State during the trial.

SUMMARY OF THE INVENTION

Accordingly the present invention provides wave measuring apparatus for determining information relating to waves on the surface of a liquid comprising: a wave buoy capable of providing a signal representative of the motion of the buoy when floating on the liquid; receiving means for receiving said signal; discriminator means having an input terminal connected to an output terminal of said receiving means; integrator means having an input terminal connected to an output terminal of said discriminator means; and indicator means connected to an output terminal of said integrator means to provide an indication of the input therefrom indicative of the said wave information.

OBJECTS OF THE INVENTION

It is an object of the present invention to provide wave measuring apparatus which may be utilized in at least one embodiment of the invention to determine the condition of a sea, particularly the height of the waves thereon.

BRIEF DESCRIPTION OF THE DRAWINGS

One embodiment of the present invention will now be described, by way of example, with reference to the accompanying drawings in which:

FIG. 9 is a typical wave table of the wind waves at sea;

DESCRIPTION OF THE PREFERRED EMBODIMENT

Figure 1:
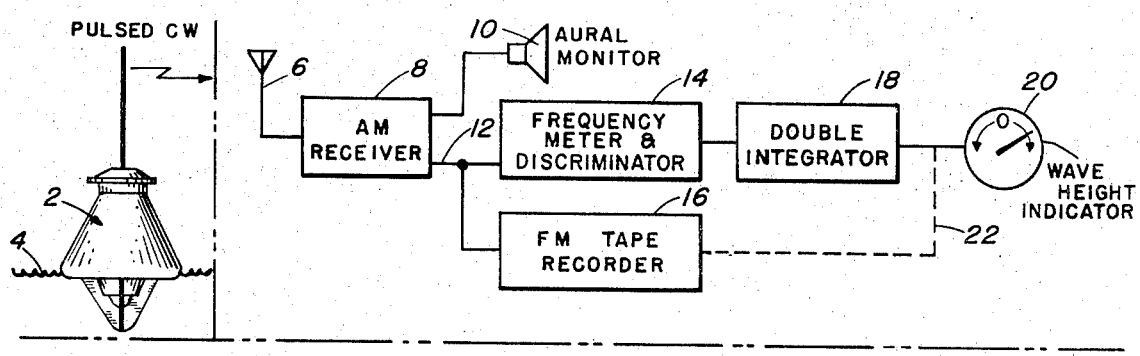
FIG. 1 is a diagrammatic representation, in block form, of wave measuring apparatus according to the present invention.

Referring to FIG. 1 a free-floating accelerometer wave buoy 2 transmits burst of RF signals at an average rate of about 30 bursts/second. The burst or pulse repetition rate, PRR, varies directly as the acceleration applied to the buoy as it moves up and down on the waves 4 of the sea on which it is located. The pulsed CW transmission is received by the associated equipment on an attendant vessel and this is indicated in FIG. 1 as including an antenna system 6 feeding into a receiver 8 for amplitude modulated signals. The receiver 8 provides two outputs, one to an aural monitor 10 and another output along connection 12, the latter output being fed to a frequency meter and discriminator unit 14 and also to an FM tape recorder stage 16. The output of the frequency meter and discriminator unit 14 is fed to a double integrator unit 18 which supplies an output to a wave height indicator unit 20. If desired, the FM tape recorder 16 can be connected, by way of a connection 22 to the output of the double integrator unit 18.

The wave measuring apparatus in FIG. 1 for determining the desired information relating to waves on the surface of the sea is used to receive and record the pulses which are transmitted from the buoy 2. The receiver 8 demodulates the signal and produces DC pulses at the same pulse repetition rate, PRR, as was transmitted from the wave buoy 2. The aural monitor 10 connected to an output of the receiver 8 indicates the presence or loss of the respective RF signal.

The output pulses from the receiver 8 are recorded on the FM tape recorder 16 so as to enable detailed laboratory analysis of the Sea State data to be made at a later time in the shore-based laboratory, since the equipment illustrated in FIG. 1 after the antenna 6 is located on a vessel floating on the sea which is to be analyzed.

The frequency meter and discriminator stage 14 standardizes the width of the DC pulses from the receiver 8 so as to provide real-time monitoring and a simple RC filter at the output of the discriminator converts the standardized pulses to a continuous DC voltage. The amplitude of this DC voltage is thus proportional to the total acceleration of the wave buoy 2. The double integrator 14 converts this analog acceleration signal into a signal which is proportional to the height of the particular waves and the wave displacements are then observed on the output meter 20. If desired, this displacement information could also be recorded in the tape recorder 16 by the connection 22.

Figure 2:
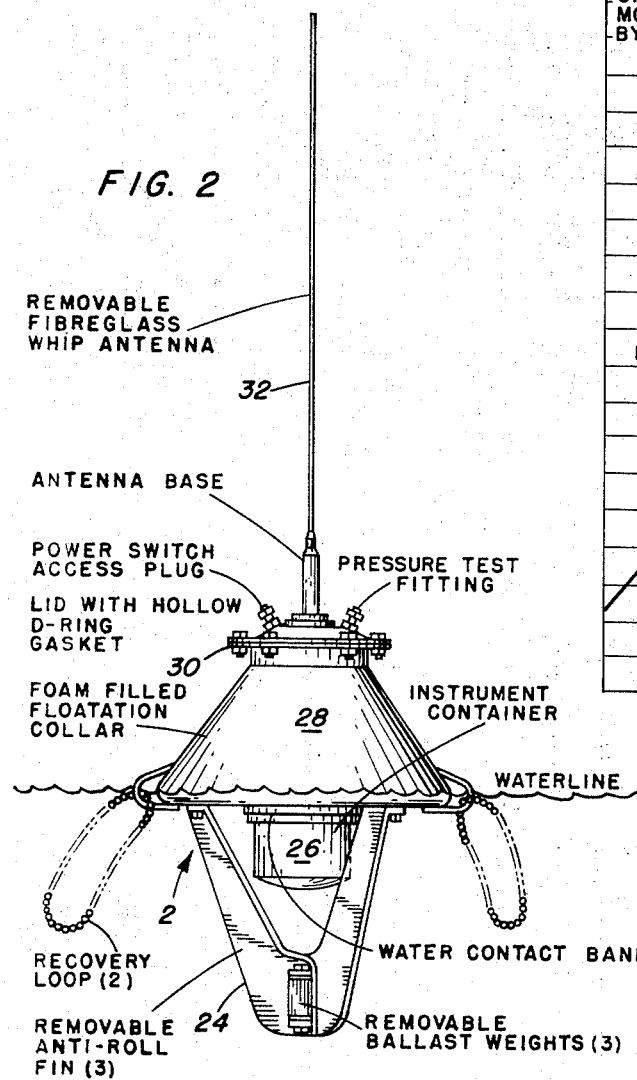
FIG. 2 is a diagrammatic representation, in greater detail than in FIG. 1, of the wave buoy used in the apparatus of FIG. 1.

In FIG. 2 the wave buoy is illustrated in greater detail and it will be seen that the free-floating accelerometer wave buoy 2 of FIG. 1 consists essentially of an accelerometer, transmitter and float. The wave buoy is of standard construction and includes removable anti-roll fins 24, an instrument container 26, a foam-filled flotation collar 28, a lid 30 with a hollow 0-ring gasket, and surmounting the buoy there is provided a removable fiberglass whip antenna 32. The wave buoy is designed primarily for deep water oceanographic use and the moving body of the accelerometer comprises the coil of a conventional permanent magnet loudspeaker, together with a supporting mechanism. An 8-inch loudspeaker is used, with a 6-ounce magnet and with the cone removed.

Two gold contacts are provided, one on the loudspeaker frame and the other attached to the moving coil of the loudspeaker. When the two contacts meet, a multivibrator circuit is triggered which in turn passes a short pulse of current through the loudspeaker coil to provide a mechanical impulse to the moving body in such a way as to open the contacts. After the impulse, the body continues to free fall until the contacts come together again. The pulse frequency of the accelerometer is thus proportional to $(g-a)$ where $g$ is the acceleration of gravity and $a$ is the vertical acceleration of the buoy. The mean repetition frequency for $g$ is set at about 30 Hz and the duration of the impulse is about 1.5 milliseconds.

RF carrier frequencies in the range 30-35 MHz may be used to provide reliable ranges of the order of ten miles. The buoy transmitter is transistorized, crystal controlled and transmits only during the period of the impulse. It requires 250 milliwatts of DC power when giving one watt peak pulses of RF energy with a duty cycle of 1 in 15, so that the theoretical economics of pulse code modulation are realized in practice. The total DC input power to the transmitter and accelerometer is one watt which is supplied from a 33-cell alkaline battery pack. Unattended operation for about 200 hours is considered normal.

The battery pack, accelerometer, transmitter and associated electronics are housed in a fiberglass float of "Gemini-shape." The float is provided with a sealed lid, pressure valve and switch, removable antenna, and two recovery hooks at water level.

Information on recorders can be found in the article by R. L. G. Gilbert, "The Design of a Deep-Water Wave Recorder," Bedford Institute of Oceanography, Dartmouth, N.S., Canada, Institute Note 63-6, November, 1963. A typical wave buoy which has been used, with modification, in apparatus according to the present invention is that manufactured by Eastech Limited, Dartmouth, Nova Scotia, Canada: "Model 266 Accelerometer Wave Buoy System," Issue 266A001, February 1967.

Experiments with one type of buoy indicated that tilt of the wave buoy creates unwanted energy which extends from very low frequencies up into the wanted spectrum. This unwanted energy is thought to be caused by:

1. tilt of the wave buoy riding on the slopes of the waves;
2. tilt due to wind forces on the wave buoy and antenna.

Analysis shows that the spectrum of tilt energy varies from day to day depending upon weather conditions and sea state, but may have periods as long as 30 seconds or as short as 2 seconds. If the acceleration signal is doubly integrated with this tilt energy present, the integration is unstable, resulting in wave height errors as high as 200 percent. However, work to date indicates that most of the tilt energy lies below the actual desired spectrum of the sea waves. When this is filtered out, the tilt energy remaining in the desired part of the spectrum is low compared to the wanted energy and so in practice the inaccuracies are small.

Early production models of the wave buoy have now been modified in an effort to reduce tilt. In order to reduce the moment of inertia and wind drag of the antenna, the former 8½-foot steel whip antenna has been replaced by a 4-foot centre-loaded fiberglass unit. In addition, outboard ballast and stabilizing fins have been fitted to the float to improve stability, as shown in FIG. 2.

Efforts are presently being made to incorporate a tilt correction mechanism within the buoy.

Figure 3:
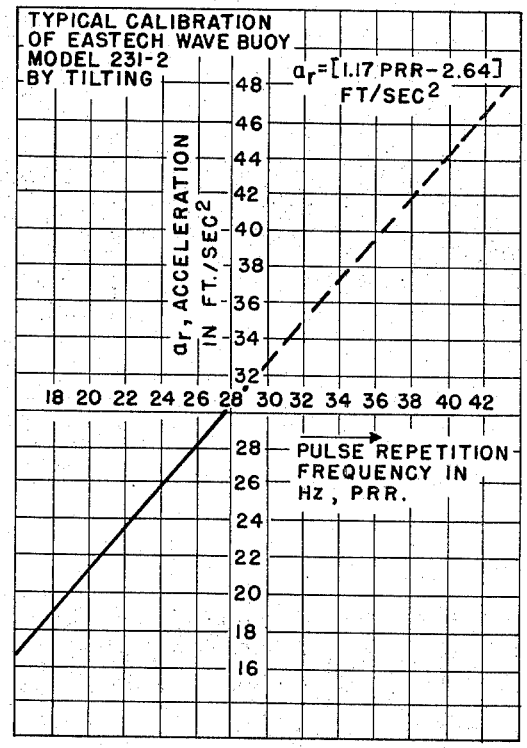
FIG. 3 is a typical static calibration curve for the buoy of FIG. 2.

A typical static calibration of the buoy is shown in FIG. 3. This was obtained by tilting the buoy known angles to the vertical and measuring the pulse repetition rate. The component of gravity acting along the buoy axis is equal to $g \cos \theta$, where $\theta$ is the angle between the buoy axis and the vertical. Thus, tilting can only decrease the effective acceleration accounting for the solid line portion of FIG. 3. This is extended by the dashed line on the assumption of linearity.

The receiver unit 8 in FIG. 1, on the attendant vessel, is used to demodulate the received pulses from the buoy 2. The receiving antenna 6 may be a folded unipole, such as Catalog No. 128-509 manufactured by the Communication Products Company. This antenna has zero db power gain over a dipole and exhibits an omnidirectional pattern.

The receiver 8 may be a commercial model S.P.-60-0-JX manufactured by The Hammarlund Manufacturing Company Incorporated and may be crystal controlled on the buoy frequency. Because the pulsed RF signal has a very low mean amplitude, the normal AVC circuit does not function adequately so a noise limiting circuit is used to provide an AVC voltage proportional to the peak of the RF signal. This circuit provides clean DC pulses and tends to eliminate interference spikes between pulses.

Figure 4:
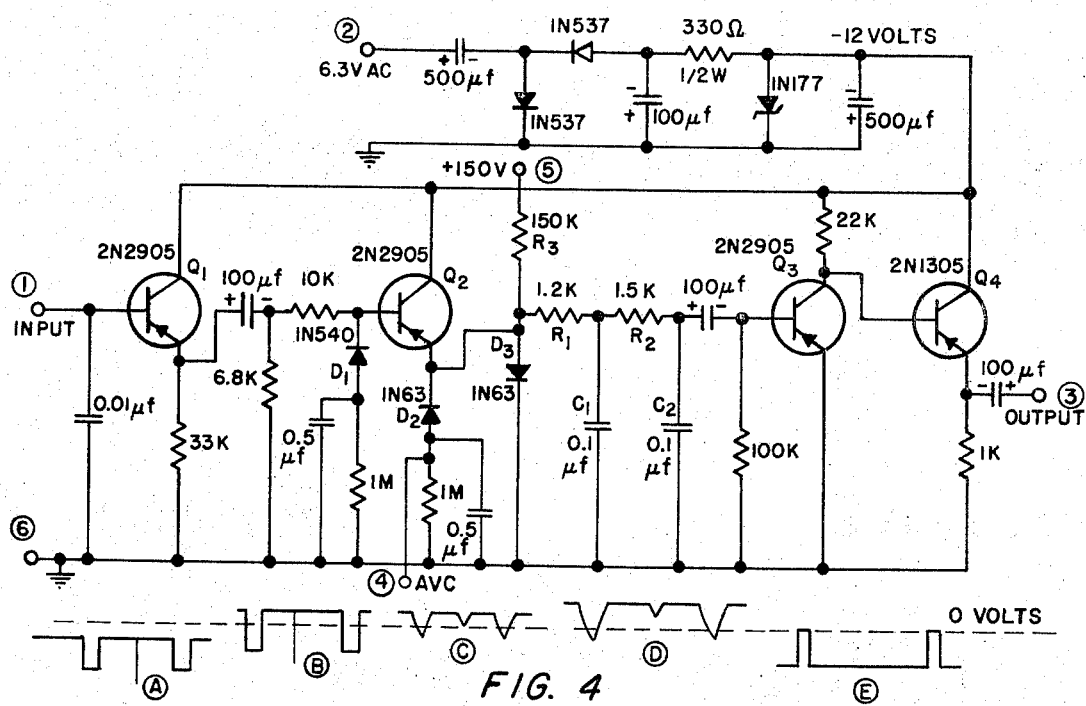
FIG. 4 is a diagrammatic representation of the noise limit circuit for the receiver of FIG. 1.

The receiver noise limiter circuit is illustrated diagrammatically in FIG. 4 and the component values and associated waveforms have been indicated for explanatory purposes. The illustrated circuit comprises a transistorized noise limiter circuit and power supply which is mounted in the receiver 8. The circuit will not be described in detail but it will be seen that $Q_1$ is a normal emitter follower, with AC coupling to $D_1$, the clipper diode. $Q_2$ is a second emitter follower, with AC coupling to $D_1$, the clipper diode. $Q_2$ is a second emitter follower feeding $D_2$, the AVC diode (which measures peak RF rather than average RF signal). $R_1 C_1$ and $R_2 C_2$ integrate the signal. The long data pulses give a high amplitude resultant, whilst the short interference pulses are attenuated. $R_3$ and $D_3$ provide a rapid fall for the integrated pulses. $Q_3$ is a self-biased amplifier, which conducts only at the peak of the integrated signals by virtue of the AC coupling and $Q_4$ is an output emitter follower. Pulse shapes shown are (A) at the input and emitter of $Q_1$; (B) at the base and emitter of $Q_2$ (interference spike clipped); (C) at the junction of $R_1$ and $R_2$ (integrated signal); (D) at the base of $Q_3$ (note further integration, and DC level); and (E) at the collector of $Q_3$ and output.

The speaker 10 is connected to 600-ohm audio output terminals on the rear of the receiver through a matching transformer. This permits aural monitoring of the received signal, thus providing a continuous operational check on the system up to the frequency meter and discriminator.

The width of the pulses from the receiver noise limiting circuit is not constant. The following factors influence pulse width;

a. differences in contact wear and adjustment, suspension contacts, electrical component values and adjustments, etc., from one buoy to another;

b. changes in accelerometer supply voltages;

c. low signal levels near noise threshold of receiver;

d. receiver AVC attack and decay times.

The frequency meter and discriminator unit 14 of FIG. 1 standardizes the pulse width and height without affecting repetition rate and could conveniently be provided by Type 1142–A of The General Radio Company.

Figure 5:
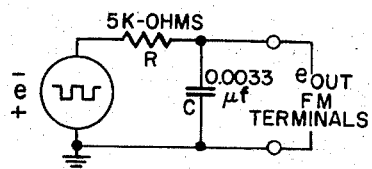
FIG. 5 is a diagrammatic representation of the equivalent circuit at the output terminals of the frequency meter unit of FIG. 1.
Figure 6:
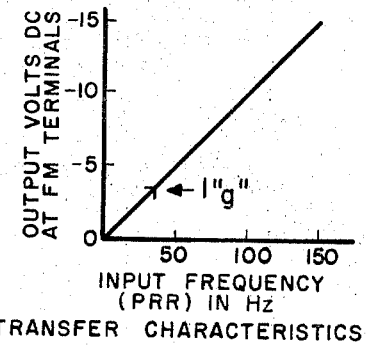
FIG. 6 is a graphical representation of the transfer characteristics of the frequency meter unit of FIG. 1; gives.

The equivalent circuit and transfer characteristic of this unit are shown in FIGS. 5 and 6. The 0.0033 $\mu f$ capacitors 34 and 5 K-ohm source resistance 36 normally used produce a low-pass break frequency of about 10 KHz. For this system, however, a low-pass break frequency of about 4 Hz would be suitable since the above-mentioned manufactured buoy used in the trials of this invention is not sensitive to wave frequencies above 2 Hz and the PRR of the buoy will normally be well above 4 Hz. At the break frequency $Xc = 1/\omega C = R$, assuming that the external load is always greater than approximately 1 M ohm. This gives a value for $C$ of 8 $\mu f$. An 8 $\mu f$ oil-filled capacitor was therefore mounted on the frequency meter and discriminator unit 18 and connected across the output terminals.

The addition of this capacitor appears to greatly reduce the peak output voltage without affecting the average value for any fixed PRR. This average DC voltage is about $-3$ volts (corresponding to a PRR of 30 Hz) due to the acceleration of gravity alone. Wave accelerations superimpose an AC voltage on this and it is this AC voltage which must be double integrated to obtain wave displacement.

The design of the double integrator unit 18 of FIG. 1 should preferably be made having regard to the following factors:

1. Only wave acceleration signals are to be integrated; i.e., it is necessary to block the DC component due to acceleration of gravity.

2. The spectrum of tilt energy varies from day to day making necessary a variable high pass cut-off frequency.

3. The design will be influenced by the operational problem of deciding on the frequency below which tilt energy should be eliminated for any particular trial.

4. Accuracy of integration of non-sinusoidal waveforms is decreased due to non-linear amplitude and/or phase vs frequency characteristics.

5. The frequencies involved for real time integration (0.08 Hz – 2.00 Hz) yield large circuit time constants and care must be taken to keep components within practical limits.

6. Elimination of the circuitry required to establish initial conditions for each integrator is desirable; i.e., AC coupling and DC feedback.

One possible solution is to pass the acceleration signal through a high pass filter with variable cut-off frequency for removal of tilt energy and then doubly integrate using perfect integrators. However, in practice no circuit could be found for the high pass filter that did not result in impractical component values (i.e., $R$ = 100 M-ohms, $C$ = 0.01 Farads), or which would give flat response and constant time delay in the pass band, these being desirable requirements.

Figure 7:
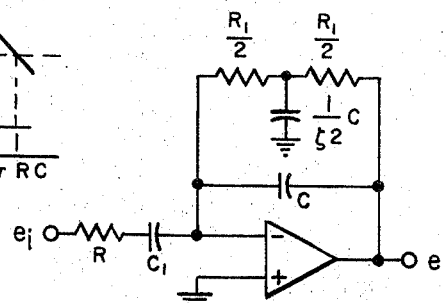
FIG. 7 is a diagrammatic representation of a single integrator stage used in the integrator unit of FIG. 1.

The type of integrator circuit which best meets the factors listed above is shown in FIG. 7. This particular circuit — see Philbrick Researchers, Inc.: "Applications Manual for Computing Amplifiers," Second Edition, p. 98 — provides integration for frequencies falling on the negative slope and differentiation for frequencies on the positive slope. Typical instrumentation applications are the conversion of acceleration to velocity, velocity to position (or vice versa), etc. For this system, however, the negative slope characteristic is used to integrate the wanted signals and positive one to attenuate the unwanted lower frequency tilt energy.

The AC coupling ($RC_1$) provided by resistor 42 and capacitor 40 blocks the gravity component of acceleration signal. The DC feedback ($R_1$) means that integration does not have to start at a particular point on the wave because when $e_i$ is suddenly applied any DC output voltage resulting from the input current required to charge $C_1$ will soon be damped out.

The components which establish the integrator slope and its position on the frequency axis are resistor 42, $R$, and capacitor 44, $C$, while $R_1$ and $C_1$ establish the differentiator slope and its position. If appropriate values of $R_1$ and $C_1$ are switched into the circuit, the differentiator slope can be made to move horizontally on the frequency axis to a new position. This would change the range of unwanted frequencies being attenuated as well as the degree of attenuation. Also the range of frequencies being integrated would be changed but this should not affect the accuracy of integration since R and C are not switched.

The large time constants involved require $R$ and $R_1$ to be megohm values in order that $C$ and $C_1$ be physically realizable. These high values of resistance in turn require operational amplifiers with very low drift current and low offset characteristics. Such requirements necessitate the use of chopper-stabilized operational amplifiers. A commercial solid state operational amplifier – Philbrick Researches, Inc., Model SP 656 – was chosen for this purpose in the experimental trials of apparatus according to this invention.

A table showing relationship among several variables associated with wind waves at sea is shown in FIG. 9 where the Symbols $H$, $T$ and $\lambda$ are defined. This is taken from the article by R. D. Fuller, "Typhoon Simulation for Vessel Design Studies," Undersea Technology, p. 34, May 1964. From inspection of this table an approximate relationship between wave period, $T$, and crest to trough wave height, $H$, for all sea states is found to be:

$$T = 2\sqrt{H}.$$

For initial design purposes, the ocean waves may be assumed to be of sinusoidal shape for simplicity. The wave height, $h$, at any time, $t$, is then:

$$h = H/2 \; \text{Sin} \; 2\pi t/T$$

Wave velocity, $v$, and acceleration, $a$, at any time, $t$, are respectively:

$$V = \pi H/T \; \text{Cos} \; 2\pi t/T$$

$$a = -2\pi^2 \; H/T^2 \; \text{Sin} \; 2\pi t/T$$

The maximum acceleration, $a_m$, will occur for $2\pi t/T = 270°$, from which $$a_m = 2\pi^3 \; H/T^3$$

Substituting $T = 2 \sqrt{H}$ gives
$a_m = \pi^2/2 = 4.94$ ft./sec.$^2$ for all sea states.

It is to be noted that the maximum acceleration is thus approximately constant for all sea states.

The buoy, then, will be subjected to accelerations of $(32 \pm 5)$ ft/sec$^2$ approximately. From the buoy calibration curve, FIG. 3, this corresponds to accelerometer frequencies in the range 25 to 34 Hz. From the discriminator voltage vs frequency curve, FIG. 6, these frequencies result in output voltages of $-2.5$ to $-3.4$ volts from the frequency meter and discriminator. The AC component of this voltage is thus about 1 volt peak-to-peak or one-half volt peak. The design approach used to determine the integrator constants was to assume two identical integrators in series. Since the maximum output of the amplifier is $\pm 10$ volts, each integrator output must be bound at about $\pm 8$ volts for protection. The overall voltage gain required is then $8/0.5 = 16$, or a gain of 4 for each integrator at the frequency giving peak response.

With reference to FIG. 7, the equations for integrator response and damping ratio are:

$$\text{Response}, \; e = \frac{e_i}{\frac{1}{J\omega R_1 C_1} + \frac{C}{C_1} + J\omega RC}$$

Damping Ratio, $$\delta = \tfrac{1}{2} \sqrt{R_1 C/RC_1}$$

Figure 8:
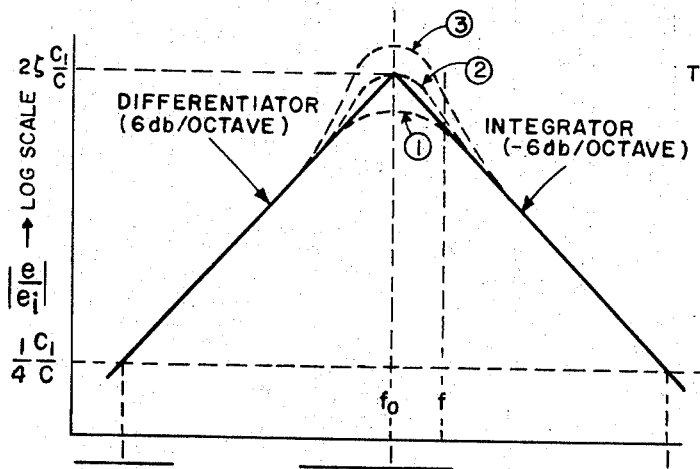
FIG. 8 is a graphical representation of the frequency response of the integrator unit of FIG. 7.

In the frequency response plot, FIG. 8, the dashed lines (1), (2) and (3) are respectively the over-damped ($\delta > 0.5$), critically damped ($\delta = 0.5$) and underdamped ($\delta < 0.5$) cases. Peak amplitude is $C_1/C$ in each case. From this plot the following observations are apparent in order to achieve accurate integration:

1. The peak response frequency, $f_o$, of the transfer characteristic must be lower than $f$, the lowest frequency being integrated. 2. The transfer characteristic must be slightly overdamped in order that the actual response (curve (1)) coincides with the $-6$ db/octave slope as close to $f_o$ as possible.

This general design information is applied in the following paragraphs to calculate particular values of $R$, $R_1$, $C$ and $C_1$ for particular sea states.

The ratio of the amplitude at the intersection of the integrator and differentiator slopes to the peak response is $2\delta$. It was found by trial and error calculation that requirement 2 above would be optimized for a $2\delta$ ratio of about 1.5 db/integrator. This gave $\delta = 0.592$.

In order that the system be capable of indicating wave heights up to Sea State 8, then, from the wave table (FIG. 9) such waves may have periods, $T$, as high as 12 seconds ($f = 0.0833$ Hz). The peak response frequency, $f_o$, is therefore chosen as 0.0673 Hz in keeping with requirement 1 above and because this frequency results in a standard value of $C_1 = 2.0 \; \mu f$ which is shown in the following design calculations.

The quantities chosen to start the design are:
1. $R = 1$ megohm
2. Gain at $f_o = C_1/C = 4$. (This will result in more gain than necessary except at $f_o$; i.e., gain control required.)
3. $\delta = 0.592$.
4. $f/f_o = 0.0833/0.0673 = 1.24$.

Substituting (1), (2) and (3) into $$\delta = \tfrac{1}{2} \sqrt{R_1 C/RC_1}$$

gives $R_1 = 5.6$ megohms or $R_1/2 = 2.8$ megohms. The peak frequency, $f_o = 1/2\pi \sqrt{RC R_1 C_1}$, then gives $CC_1 = 10^{-12}$. Since $C_1/C = 4$, then $C = 0.5 \; \mu f$, $C_1 = 2.0 \; \mu f$ and $C/\delta^2 = 1.43 \; \mu f$.

This completes the design of an integrator for signals having $T < 12$ seconds. The calculated response is shown as curve ($a$) in FIG. 10.

Figure 10:
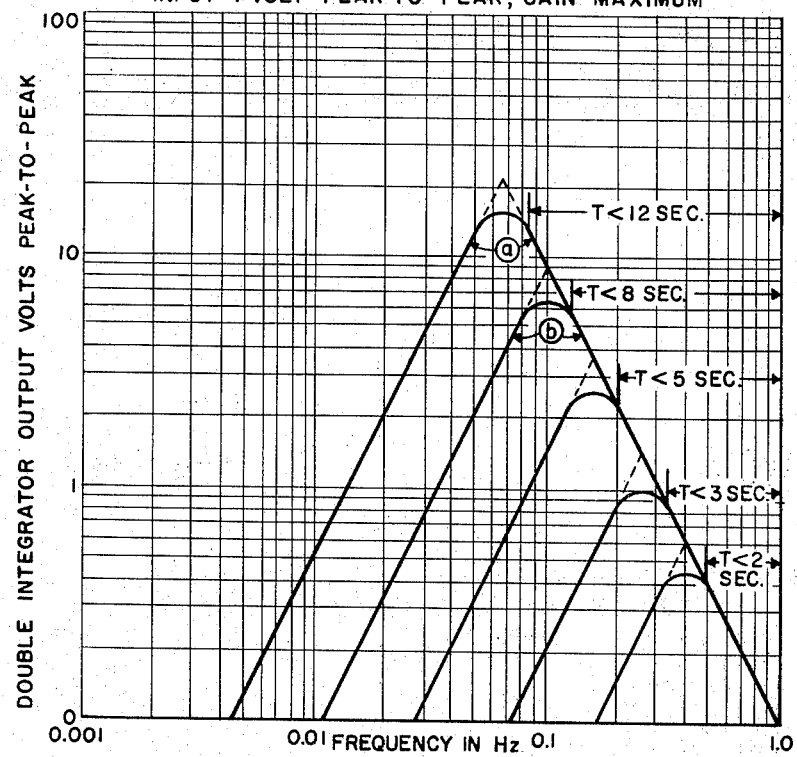
FIG. 10 shows typical response curves for the integrator stage of FIG. 1.

The different differentiator slope positions shown in FIG. 10 are obtained by switching in different values of $R_1$ and $C_1$. Switch positions permitting integration of signals having periods less than 12, 8, 5, 3 and 2 seconds are provided for a wide range of sea states. The design for each switch position will be illustrated by considering the case for $T < 8$ seconds.

The values of $R$, $C$, $\delta$ and $C/\delta^2$ will remain the same as for the case $T < 12$ seconds. The ratio $f/f_o$ should remain as close to 1.24 as will allow $R_1$ and $C_1$ to be made up of standard values. In this case, $f/f_o = 1.19$ results in $R_1/2 = 1.8$ megohms as shown below:

$$f_o = 1/(8 \times 1.9) = 0.105 \; \text{Hz} = 1/2\pi \sqrt{R C R_1 C_1}$$

from which $R_1 C_1 = 4.6$.

$$\delta = 0.592 = \tfrac{1}{2} \sqrt{R_1 C/RC_1}$$

from which $R_1/C_1 = 2.8 \times 10^{12}$.

Thus, $R_1 = 3.6$ megohms, $C_1 = 1.28 \; \mu f$.

These values give the calculated response (curve ($b$)) shown in FIG. 10.

Figure 11:
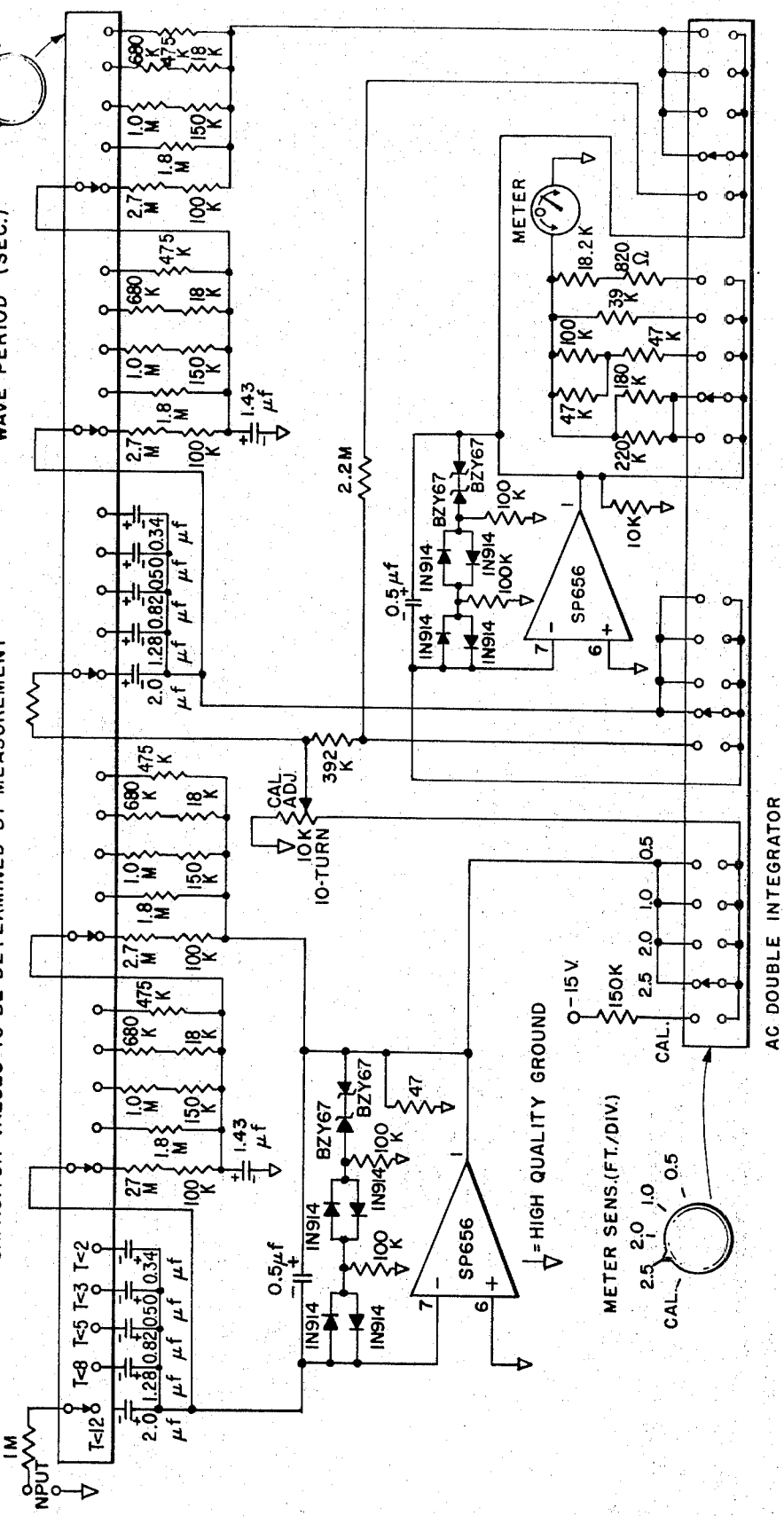
FIG. 11 is a representation of a typical circuit for the integrator stage of FIG. 1, shown in greater detail.

The complete circuit for the double integrator unit 18 of FIG. 1 is shown in FIG. 11. The bound circuits are conventional and limit the output of either integrator to about $\pm 8$ volts.

The shunting effect of the bound circuit on the desired feedback was tested by connecting the bounded SP 656 as an inverting amplifier. One per cent resistors were used with $R_{in} = 1$ megohm and $R_f = 10$ megohms. The voltage gain measured exactly $-10$, indicating an effective resistance of the bound circuit considerably greater than 100 megohms which has a negligible effect on the circuit time constants.

The gain may be varied by a CAL. ADJ. potentiometer to account for changes in sensitivity between buoys.

Wave displacements may be observed in real time on a Weston Model 301 DC microampere panel meter. A METER SENS, switch is provided to obtain up-scale meter deflections for most sea states.

When the METER SENS, switch is in CAL position the output integrator becomes a DC amplifier. Its gain is adjustable by the CAL ADJ control thus permitting calibration of the double integrator for any particular buoy sensitivity.

Figure 12:
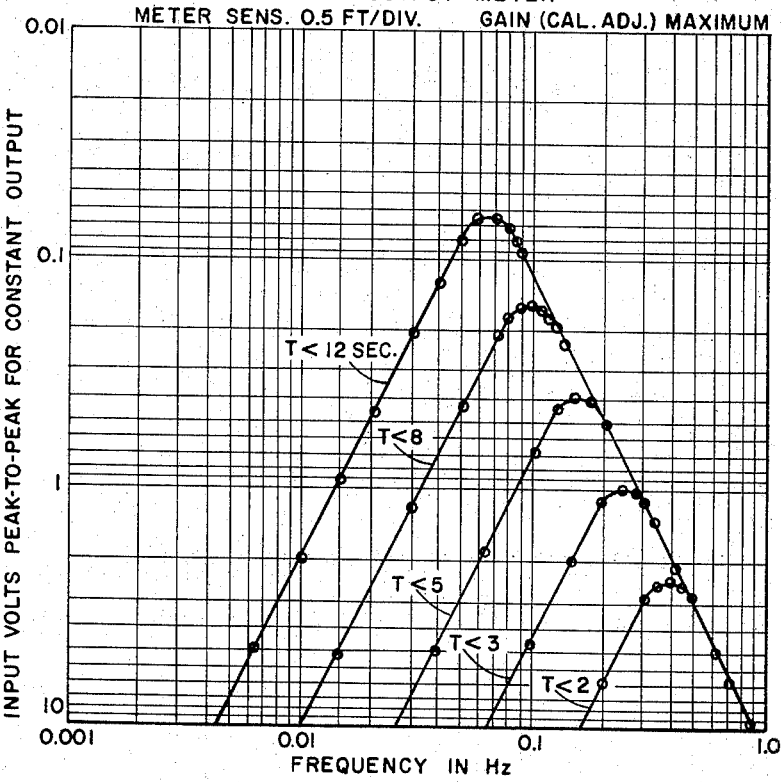
FIG. 12 is a graphical representation of the results of actual experiments using a function generator, as opposed to the theoretical curves of FIG. 10.

The response curves of FIG. 10 were checked experimentally using a function generator. The results are shown in FIG. 12 and it will be seen that these curves agree closely with the theoretical curves of FIG. 10 even though the measurements were difficult to make at such low frequencies.

To check the expected error in peak-to-peak wave height due to phase distortion in the double integrator, trochoidal waves are assumed. This is a reasonable assumption for the present purpose since the speed, period and length relations of trochoidal waves are known to agree well with actual waves - Rossell, H. E. and Chapman, L. B.: "Principles of Naval Architecture," Vol. II, pages 2-8, 1949.

The parametric equiations describing the trochoidal wave are:

$$X = (\lambda/2\pi) \theta - (H/2) \sin \theta$$
$$y = H/2 \cos \theta \quad (1)$$

where $X$ and $y$ are the horizontal and vertical space coordinates of the wave respectively. The mean height (dc value) of the wave in (1) is not equal to zero, but this fact is of no interest because the dc component is "blocked" by the high fidelity AC integrator. Hence the dc component will be excluded in all calculations to follow.

To simplify the phase distortion calculation, it is convenient to expand (1) into the Fourier Series:

$$Y = \sum_{n=1}^{m} a_n \cos \frac{2\pi n X}{\lambda} \quad (2)$$

An expression for $a_n$ in term of $H$ and $\lambda$ is derived in the Mathematical Derivation below. Tables of $a_n/H$ for $n = 1, 2, 3, \ldots 9$ and for $R = \pi H/\lambda = 0.05, 0.06, 0.07, \ldots 30$ are included. Mathematical Derivation: Trochoidal waves - a Fourier series expansion.

INTRODUCTION

The waves of the sea are in general not of small amplitude. A complete description for deep-water waves of finite amplitude, under the assumption of rotational particle motion, was first published by Gerstner in 1802. His theory is exact and nonlinear, and yields a wave profile that is trochoidal. A more realistic description, in which the particle motion is irrotational, was developed by Stokes for water of finite depth — see B. Kinsman, *Wind Waves*, Englewood Cliffs: Prentice-Hall, 1965, Chap. 5. To the third order in the wave amplitude, however, the results of Gerstner and Stokes are identical.

The simplicity of the Gerstner or trochoidal wave has accounted for its widespread use in problems of naval architecture and oceanography — see also *Principles of Naval Architecture*, Vol. 2, H. E. Rossell and L. B. Chapman, Eds. N. Y.: The Society of Naval Architects and Marine Engineers, 1949, Chap. 1. In some applications, the use of a Fourier series representation is convenient because only the first few terms of the series are significant. An exact expression for the Fourier coefficients of a trochoidal wave is derived in this paper. Numerical values of these coefficients for various ratios of wave amplitude to fundamental wavelength are included.

THE TROCHOIDAL WAVE

The parametric equations for the trochoidal wave are:

$$x = (\lambda/2) \theta - (h/2) \sin \theta$$
$$y = h/2 \cos \theta, \quad (I)$$

where
- $x$ = horizontal particle displacement,
- $y$ = vertical particle displacement,
- $\theta$ = parameter of curve $y(x)$,
- $\lambda$ = fundamental wavelength,
- $h$ — peak-to-peak wave height.

Figure 13:
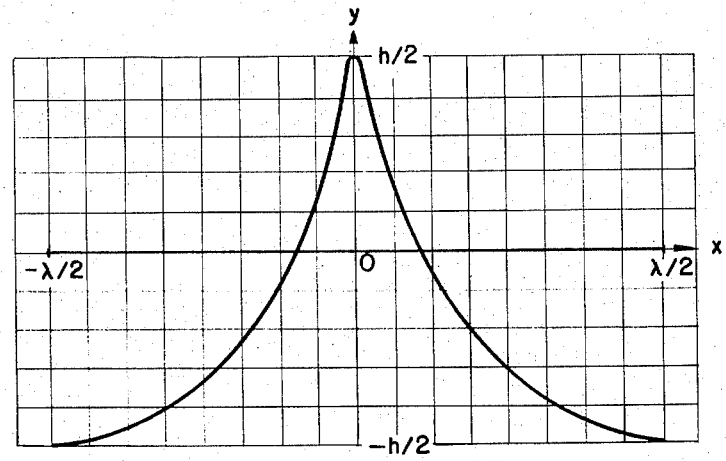
FIG. 13 is a diagrammatic representation of the profile of a trochoidal wave.
Figure 14:
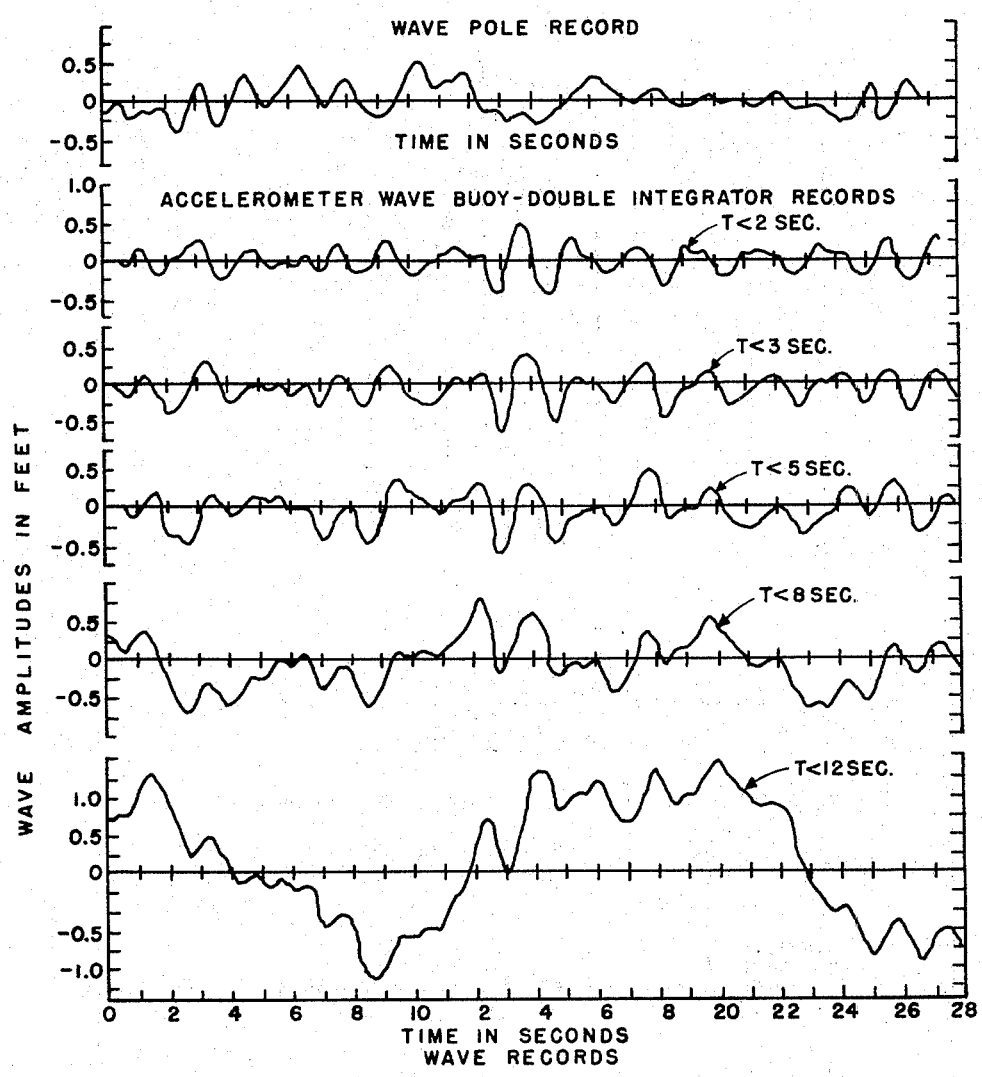
FIG. 14 is a graphical representation of typical wave records.

In general, $h \leq \lambda/\pi$; the equality $h = \lambda/\pi$ corresponds to the critical case. FIG. 13 shows the wave profile for Eq. (I).

FOURIER SERIES REPRESENTATION

The function $y(x)$ is even with period $\lambda$. Therefore its Fourier series representation is $$y(x) = \frac{a_0}{2} + \sum_{n=1}^{\infty} a_n \cos \frac{2n\pi x}{\lambda}, \quad (II)$$

where the coefficients $a_n (n = 0, 1, 2, \ldots)$ are given by $$a_n = \frac{4}{\lambda} \int_0^{\lambda/2} y(x) \cos \frac{2n\pi x}{\lambda} dx. \quad (III)$$

The substitution of (I) into (III) yields $$a_n = \frac{h}{\pi} \int_0^\pi (1 - R \cos \theta) \cos \theta \cos (n\theta - nR \sin \theta) d\theta,$$

where $$R = \pi h/\lambda. \quad (IV)$$

The application of the integral representation for the Bessel function of the first kind of integer order and argument $u$, namely $$J_n(u) = \frac{1}{\pi} \int_0^\pi \cos (n\theta - u \sin \theta) d\theta,$$

gives $$a_n = \frac{h}{2} \left\{ J_{n+1}(nR) + J_{n-1}(nR) - \frac{R}{2} [J_{n+2}(nR) + 2J_n(nR) + J_{n-2}(nR)] \right\}.$$

The use of the recurrence formulas $$(2n/u) J_n(u) = J_{n+1}(u) + J_{n-1}(u)$$

and $$J_n'(u) = \frac{1}{2}[J_{n-1}(u) - J_{n+1}(u)]$$

yields the required result $$a_n = (h/2n) J_n{}'(nR), \quad (V)$$

where $J_n{}'(nR)$ is the derivative of $J_n(nR)$ with respect to the argument $nR$.

Tables of $a_n/h$ for values of $R(=\pi h/\lambda)$ ranging from 0.05 to 0.30 and for n equal to 1,2,...,9 are presented below. For fixed $R(\leq 0.2)$, the entires show that the values of $a_n$ decrease rapidly as $n$ increases.

TABLE OF $a_n/h$ for R = .05,.06,...,.30 and n = 1,2,3

| R\n | 1 | 2 | 3 |
|---|---|---|---|
| .05 | .249766E 0 | .623959E-2 | .233826E-3 |
| .06 | .249663E 0 | .748201E-2 | .336362E-3 |
| .07 | .249541E 0 | .872144E-2 | .457268E-3 |
| .08 | .249400E 0 | .994738E-2 | .596407E-3 |
| .09 | .249241E 0 | .111893E-1 | .753623E-3 |
| .10 | .249063E 0 | .124168E-1 | .928739E-3 |
| .11 | .248867E 0 | .136393E-1 | .112156E-2 |
| .12 | .248651E 0 | .148564E-1 | .133186E-2 |
| .13 | .248417E 0 | .160675E-1 | .155941E-2 |
| .14 | .248165E 0 | .172722E-1 | .180394E-2 |
| .15 | .247894E 0 | .184699E-1 | .206519E-2 |
| .16 | .247604E 0 | .196603E-1 | .234286E-2 |
| .17 | .247296E 0 | .208428E-1 | .263663E-2 |
| .18 | .246969E 0 | .220169E-1 | .294617E-2 |
| .19 | .246624E 0 | .231823E-1 | .327113E-2 |
| .20 | .246260E 0 | .243383E-1 | .361114E-2 |
| .21 | .245878E 0 | .254846E-1 | .396580E-2 |
| .22 | .245478E 0 | .266207E-1 | .433473E-2 |
| .23 | .245059E 0 | .277461E-1 | .471748E-2 |
| .24 | .244622E 0 | .288604E-1 | .511364E-2 |
| .25 | .244166E 0 | .299631E-1 | .552274E-2 |
| .26 | .243692E 0 | .310538E-1 | .594432E-2 |
| .27 | .243200E 0 | .231320E-1 | .637789E-2 |
| .28 | .242690E 0 | .331974E-1 | .682295E-2 |
| .29 | .242162E 0 | .342494E-1 | .727899E-2 |
| .30 | .241615E 0 | .352877E-1 | .774548E-2 |

Note: The tabular entries are given in the Fortran E format. Thus for example, the entry .774548E-2 denotes .774548×10⁻².

TABLE OF $a_n/h$ for R = .05,.06,...,.30 and n = 4,5,6

| R\n | 4 | 5 | 6 |
|---|---|---|---|
| .05 | .103855E-4 | .506775E-6 | .262544E-7 |
| .06 | .179224E-4 | .104916E-5 | .652061E-7 |
| .07 | .284156E-4 | .194002E-5 | .140622E-6 |
| .08 | .423399E-4 | .330234E-5 | .273460E-6 |
| .09 | .601616E-4 | .527658E-5 | .491347E-6 |
| .10 | .823378E-4 | .802002E-5 | .829387E-6 |
| .11 | .109315E-3 | .117061E-4 | .133092E-5 |
| .12 | .141528E-3 | .165235E-4 | .204821E-5 |
| .13 | .179398E-3 | .226757E-4 | .304309E-5 |
| .14 | .223335E-3 | .303794E-4 | .438750E-5 |
| .15 | .273732E-3 | .398642E-4 | .616397E-5 |
| .16 | .330966E-3 | .513712E-4 | .846601E-5 |
| .17 | .395399E-3 | .651520E-4 | .113984E-4 |
| .18 | .467374E-3 | .814674E-4 | .150776E-4 |
| .19 | .547216E-3 | .100586E-3 | .196315E-4 |
| .20 | .635230E-3 | .122785E-3 | .251998E-4 |
| .21 | .731701E-3 | .148344E-3 | .319338E-4 |
| .22 | .836893E-3 | .177550E-3 | .399963E-4 |
| .23 | .951048E-3 | .210691E-3 | .495612E-4 |
| .24 | .107438E-2 | .248056E-3 | .608132E-4 |
| .25 | .120710E-2 | .289936E-3 | .739476E-4 |
| .26 | .134937E-2 | .336618E-3 | .981692E-4 |
| .27 | .150133E-2 | .388398E-3 | .106692E-3 |
| .28 | .166312E-2 | .445528E-3 | .126739E-3 |
| .29 | .183482E-2 | .508311E-3 | .149539E-3 |
| .30 | .201651E-2 | .577006E-3 | .175329E-3 |

TABLE OF $a_n/h$ for R = .05,.06,...,.30 and n = 7,8,9

| R\n | 7 | 8 | 9 |
|---|---|---|---|
| .05 | .141775E-8 | .789252E-10 | .449727E-11 |
| .06 | .422421E-8 | .282112E-9 | .192348E-10 |
| .07 | .106246E-7 | .827548E-9 | .659767E-10 |
| .08 | .236037E-7 | .210033E-8 | .191298E-9 |
| .09 | .476912E-7 | .477211E-8 | .488765E-9 |
| .10 | .894035E-7 | .993514E-8 | .113009E-8 |
| .11 | .157728E-6 | .192703E-7 | .240984E-8 |
| .12 | .264646E- | .352517E-7 | .480635E-8 |
| .13 | .425687E-6 | .613890E-7 | .906175E-8 |
| .14 | .660507E-6 | .102509E-6 | .162844E-7 |
| .15 | .993484E-6 | .165078E-6 | .280763E-7 |
| .16 | .145433E-5 | .257559E-6 | .466889E-7 |
| .17 | .207870E-5 | .390812E-6 | .752088E-7 |
| .18 | .290878E-5 | .578526E-6 | .117777E-6 |
| .19 | .399393E-5 | .837687E-6 | .179842E-6 |
| .20 | .539120E-5 | .118907E-5 | .268448E-6 |
| .21 | .716588E-5 | .165777E-5 | .392565E-6 |
| .22 | .939204E-5 | .227373E-5 | .563444E-6 |
| .23 | .121530E-4 | .307230E-5 | .795022E-6 |
| .24 | .155415E-4 | .409481E-5 | .110435E-5 |
| .25 | .196606E-4 | .538912E-5 | .151208E-5 |
| .26 | .246234E-4 | .701017E-5 | .204290E-5 |
| .27 | .305532E-4 | .902056E-5 | .272615E-5 |
| .28 | .375843E-4 | .114910E-4 | .359627E-5 |
| .29 | .458613E-4 | .145009E-4 | .469341E-5 |
| .30 | .555393E-4 | .181387E-4 | .606440E-5 |

The expansion in (2) expresses $y$ as a function of $x$. To describe the up and down motion of the buoy as the waves pass by, $y$ should be expressed as a function of time $t$. The quantities $x$ and $t$ are related by $$x = \lambda \, t/T \quad (3)$$

The substitution of (3) into (2) yields $$y = \sum_{n=1}^{m} a_n \cos \frac{2\pi nt}{T} \quad (4)$$

The acceleration a is obtained by differentiating (4) twice with respect to $t$:

$$a = \frac{d^2y}{dt^2} = -\left(\frac{2\pi}{T}\right)^2 \sum_{n=1}^{m} n^2 a_n \cos \frac{2\pi nt}{T} \quad (5)$$

The case of the Sea State 7 is chosen for the phase distortion calculation. From FIG. 9, value of $T = 10$ seconds corresponds to $H = 27$ feet and $\lambda = 520$ feet. For these values of $T$, $H$ and $\lambda$, the value of $\pi H/\lambda = 0.16312$ and the corresponding values of $a_n/H$ for n=1,2,3 and 4 are $a_1/H = 0.24751$  $a_2/H = 0.020030$
$a_3/H = 0.0024328$  $a_4/H = 0.00035029$ The use of the above numerical values in (5) yields $$a = -2.628 \cos(\pi t/5) - 0.8540 \cos(2\pi t/5)$$
$$-0.2334 \cos(1\pi t/5) - 0.05974 \cos(4\pi t/5) \quad (6)$$

From FIG. 3, the equation describing a typical buoy is $a_T + [1.17 \, PRR - 2.64]$ ft/sec² where $a_T$ is the sum of acceleration of gravity, $g$, and the wave acceleration, $a$. Substituting $g = 32$ ft/sec² gives:

$$a = [1.17 \, PRR - 34.64] \text{ ft/sec}^2 \quad (7)$$

From FIG. 6, the transfer equation for the Frequency Meter and Discriminator is seen to be:

$$V_{out} = -(PRR/10) \text{ volts} \quad (8)$$

Combining (7) and (8) gives:

$$V_{out} = -[(a/11.7) + 2.96] \text{volts} \quad (9)$$

The input signal to the double integrator, $e_t$, is blocked to DC, giving:

$$e_t = -(a/11.7) \text{ volts} \quad (10)$$

Combining (6) and (10) gives the series expression for the double integrator signal:

$$e_i = [0.225 \cos(\pi t/5) + 0.073 \cos(2\pi t/5) + 0.020 \cos(3\pi t/5) + 0.005 \cos(4\pi t/5)] \text{ volts} \quad (11)$$

For two identical integrators in series the transfer equation is:

$$\frac{e_0}{e_i} = \frac{1}{\left[\frac{1}{j\omega R_1 C_1} + \frac{C}{C_1} + j + \omega RC\right]^2} \quad (12)$$

For the Sea State 7 case chosen, FIG. 7 indicates that the circuit constants for the $T>12$ sec. switch position must be used. These are:
$R = 1$ megohm $\quad C = 0.5 \mu f$
$R_1 = 5.6$ megohm $\quad C_1 = 2.0 \mu f$
Substitution of these values into (12) gives:

$$e_o/e_i = 1/[0.25 + j(\omega/2) - j(0.0893/\omega)]^2 \quad (13)$$

The following procedure is now used. Equation (13) is used to calculate the output corresponding to each term in (11). The total output is then the sum of these individual outputs. This total output in turn is compared with a perfect output obtained by integrating equation (11) twice mathematically. The mathematical output must be multiplied by a constant factor (−4.28) to account for the gain and phase inversion of the actual circuit before the comparison can be made. This makes the coefficient of the fundamental term equal for both outputs. The results of this procedure are summarized in the following table.

TABLE I.—DOUBLE INTEGRATOR CHARACTERISTICS

Sea state 7, T=10 sec., H, 27 ft.,=520 ft.

| | | |
|---|---|---|
| Quantity, total input: | $e_i = [0.225 \cos(\pi t/5) + 0.073 \cos(2\pi t/5) + 0.020 \cos(3\pi t/5) + 0.005 \cos(4\pi t/5)]$ volts | |
| Component inputs: | f=0.1 Hz $e_{ia}=0.225 \cos(\pi t/5)$ | f=0.2 Hz $e_{ib}=0.073 \cos(2\pi t/5)$ |
| | f=0.3 Hz $e_{ic}=0.020 \cos(3\pi t/5)$ | f=0.4 Hz $e_{id}=0.005 \cos(4\pi t/5)$ |
| Transfer equations: | $\frac{e_{oa}}{e_{ia}}=10.85 \, e^{-j0.384\pi}$ | $\frac{e_{ob}}{e_{ib}}=2.69 \, e^{-j0.731\pi}$ |
| | $\frac{e_{oc}}{e_{ic}}=1.16 \, e^{-j0.825\pi}$ | $\frac{e_{od}}{e_{id}}=0.65 \, e^{-j0.870\pi}$ |
| Actual output (calculated): | $e_{o1}=2.446 \cos[\pi(t/5-0.384)]+0.196 \cos[2\pi(t/5-0.366)]+0.023 \cos[3\pi 9t/5-0.275)]+0.003 \cos[4\pi(t/5-0.217)]$ | |
| Mathematical output: | $e_{o2}=2.446 \cos(\pi t/5)+0.198 \cos(2\pi t/5)+0.024 \cos(3\pi t/5)+0.003 \cos(4\pi t/5)$ | |

If the phase shift of each component of the actual output was ideal, the precent peak-to-peak amplitude error, $E_t$, would be
$E_t=((4.940 − 4.938)/4.940)100 = 0.0405$ percent
The actual output was calculated in the region of its maximum and minimum giving a peak-to-peak amplitude of 4.918 volts. The actual peak-to-peak error is then
$E_t = ((4.940 − 4.918)/4.940) 100 = 0.4453$ percent This error is essentially a maximum since the 10-second wave periods used for the calculation are close to the maximum permissible of 12 seconds. Although this error of 0.4453 percent is primarily due to different time delays for the component inputs, it is very small and should have negligible effect on the accuracy of the double integrator.

In experiments using apparatus according to the invention, the accelerometer pulses from the receiver were recorded on one channel of an FM tape recorder. A known wave pole output was simultaneously recorded on another channel.

In the laboratory the wave buoy data was played back through the double integrator unit 18 and recorded on one channel of an optical recording oscillograph. The same portion of tape was played back five times with the wave period switch of the double integrator in each of its five positions. The reproduced oscillographic traces are shown in FIG. 13.

As a comparison, data from the known wave pole system was obtained. The wave pole data was also recorded on the optical recording oscillograph and is shown in the upper part of FIG. 13. Both sets of wave records represent the same period of time but were separated in space by about 200 yards on a line parallel to the wave fronts.

although the waves were small, good agreement in the period and peak-to-peak height is obtained for the double integrator wave period switch in either the $T<2$ or $T<3$ second positions, but of course they will not be exact duplicates due to the physical separation of the pole and buoy. Also demonstrated was the feasibility of estimating the wave period during the trail in order to know which position to set the wave period switch. An estimate of 2 seconds was made at the time of this trial by timing peaks on the panel meter.

From FIG. 13, erroneous results are seen to be obtained if the wave period switch is in too high a time setting for the particular sea state. This is probably caused by the integration of low frequency tilt energy as previously discussed. In the $T<12$ seconds position, the double integrator shows the small waves superimposed on an apparent 3 foot peak-to-peak long period swell. This swell is known to have been nonexistent since it was not observed during the trial and is not evident in the wave pole record.

Another observation from the trial was that the buoys tilted badly in one foot peak-to-peak waves. Tilt angles as high as ± 25° were estimated. It was felt that if the outboard ballast and stability fins were extended two or three times their present depth below the buoy the situation would be considerably improved.

CALIBRATION AND OPERATION OF APPARATUS

The sensitivity of each buoy differs slightly and this requires a primary system calibration for each one.

A calibrating rig may be used to oscillate the buoy sinusoidally, in which case the period and peak-to-peak displacement will be known. One particular calibrating rig used has a period of 6 ¾ seconds with a peak-to-peak vertical displacement of 9 ¾ feet.

The calibration setup is essentially the same as FIG. 1 with the exception of the tape recorder. The double integrator controls are set as follows:

wave period — $T<12$ seconds
meter sens. — 0.5 ft/div.

The procedure is simply to oscillate the buoy and adjust the Cal. Adj. on the double integrator until the meter reads the known displacement. The meter sens. switch is then moved to Cal. position and the meter reading noted. This meter reading is then associated with the serial number of the buoy.

When a trial is conducted, the correct sensitivity is then easily set. The serial number of the buoy will be known. With the Meter Sens. switch Cal. position, the Cal. Adj. is adjusted until the meter reads the value obtained during primary calibration.

Although wave height estimates made by observers on board ship are usually quite inaccurate, wave length and period can be judged with reasonable accuracy — Rossel, H. E. and Chapman, L. B.: "Principles of Naval Architecture," Vol. II, pages 2–8, 1949. This fact is used to set the wave period switch in the correct position. The predominant wave period is first estimated by observation and the wave period switch is then placed in the next highest position. The wave period is then checked by timing the wave height meter swing and the wave period switch repositioned if necessary. For example, the wave period may be estimated to be 4.5 seconds by observation. So the wave period switch is placed in the $T<5$ position. If after timing the period of the wave height meter swing it was found to be closer to 6 seconds, the wave period switch should be repositioned to the $T<8$ position.

The double integrator unit 18 may be used as previously described to obtain sea state information. In addition to a wave displacement signal, it is also possible to obtain a wave vertical velocity signal at the output of the first integrator, should it be desired. It may well be that in practice other forms of readout may be more suitable than the analog meter 20 (FIG. 1). A large variety of readouts are possible. However, adaptation of a particular readout should present no problem since the difficult task of performing the real time integration is complete with analog velocity and displacement signals provided.

One problem remaining is that of finding the buoys after a trial since they are free floating and may be separated by several miles. The simplest solution appears to be the use of a unidirectional antenna. Commercial units such as that of Communication Products Company, Catalog No. 206–509 are available or a transmitter-hunt-loop-see The A.R.R.L. Antenna Book, Ninth Edition, page 312 — may be constructed for the purpose.

What is claimed is:

1. Wave measuring apparatus for determining information relating to waves on the surfaces of a liquid comprising:
   a wave buoy capable of providing a signal representative of the motion of the buoy when floating on the liquid;
   receiving means for receiving said signal;
   discriminator means having an input terminal connected to an output terminal of said receiving means;
   integrator means having an input terminal connected to an output terminal of said discriminator means, said intergrator means having differentiator means including a capacitor connected to its input terminal in series with its input signal; and
   indicator means connected to an output terminal of said integrator means to provide an indication of the output therefrom indicative of the said wave information.

2. Wave measuring apparatus for determining the wave height of waves on the surface of a liquid comprising:
   a wave buoy capable of providing a signal representative of the motion of the buoy when floating on the liquid;
   receiving means for receiving said signal;
   discriminator means having an input terminal connected to an output terminal of said receiving means;
   integrator means having an input terminal connected to an output terminal of said discriminator means, said integrator means having differentiator means including a capacitor connected to its input terminal in series with its input signal; and
   indicator means connected to an output terminal of said integrator means to provide an indication of the output therefrom indicative of the said wave height.

3. Wave measuring apparatus according to claim 2 wherein said integrator means includes a double integrator unit.

4. Wave measuring apparatus according to claim 2 wherein said discriminator means is a frequency meter and discriminator unit.

5. Wave measuring apparatus according to claim 4 wherein said integrator means includes two integrator circuits whereby a double integration operation is performed on the input signals fed to the integrator whereby a substantial portion of wave buoy tilt energy is removed from the output of the integrator means.

6. Wave measuring apparatus according to claim 5 wherein said double integration operation includes integration for frequencies falling on the negative slope and differentiation for frequencies on the positive slope of the characteristic of said integrator means.

7. Apparatus for measuring vertical accelerations comprising in combination:
   accelerometer means for generating an output signal whose frequency is proportional to vertical acceleration;
   receiving means for receiving and demodulating the output of said accelerometer means;
   means for standardizing the output signal of said receiving means with respect to all characteristics except frequency;
   filter means for receiving the output of said standardizing means and blocking out a predetermined band of low frequencies, including D.C; and
   double integrator means for integrating the output of said filter means, said double integrator means operating to integrate only those of its input signals having a frequency above a predetermined frequency.

8. Apparatus as in claim 7, wherein said integrator means acts to differentiate those of its input signals having a frequency below said predetermined frequency.

9. Apparatus as in claim 7, wherein said integrator means has an input terminal and includes a differentiator circuit, including a capacitor, at said input terminal in series with its input signal.

10. Apparatus as in claim 9, wherein said integrator means includes dc feedback means to reduce the effect of dc leakage through said capacitor.

* * * * *